United States Patent
Townsend et al.

(10) Patent No.: US 8,323,457 B2
(45) Date of Patent: Dec. 4, 2012

(54) DIVIDING WALL COLUMN WITH A HEAT PUMP

(75) Inventors: Derek William Townsend, High Wycombe (GB); Cyril Collins, Berkhamsted (GB)

(73) Assignee: Kellogg Brown & Root LLC, Houston, TX (US)

( * ) Notice: Subject to any disclaimer, the term of this patent is extended or adjusted under 35 U.S.C. 154(b) by 438 days.

(21) Appl. No.: 12/607,900

(22) Filed: Oct. 28, 2009

(65) Prior Publication Data

US 2010/0108487 A1 May 6, 2010

Related U.S. Application Data

(60) Provisional application No. 61/109,736, filed on Oct. 30, 2008.

(51) Int. Cl.
*B01D 1/28* (2006.01)
*B01D 3/14* (2006.01)
*F25B 1/08* (2006.01)

(52) U.S. Cl. ............. 203/21; 62/115; 62/121; 62/324.1; 202/153; 202/158; 202/182; 203/24; 203/26; 203/27; 203/98; 203/99; 203/DIG. 4; 203/DIG. 8; 203/DIG. 9; 203/DIG. 19

(58) Field of Classification Search ............. 62/115, 62/121, 324.1; 202/153, 158, 182; 203/21, 203/24, 26, 27, 98, 99, DIG. 4, DIG. 8, DIG. 9, 203/DIG. 19
See application file for complete search history.

(56) References Cited

U.S. PATENT DOCUMENTS

| | | | |
|---|---|---|---|
| 1,953,735 A * | 4/1934 | Wallis | 196/139 |
| 2,471,134 A | 5/1949 | Wright | |
| 3,575,007 A * | 4/1971 | Gunther | 62/620 |
| 4,357,153 A | 11/1982 | Erickson | |
| 4,541,943 A | 9/1985 | Powell | |
| 4,626,321 A | 12/1986 | Grethlein et al. | |
| 4,695,349 A | 9/1987 | Becker et al. | |
| 5,435,436 A * | 7/1995 | Manley et al. | 203/74 |
| 5,755,933 A | 5/1998 | Ognisty et al. | |
| 5,914,012 A | 6/1999 | Kaibel et al. | |
| 5,935,388 A | 8/1999 | Meszaros | |
| 6,077,985 A | 6/2000 | Stork | |
| 6,347,533 B1 | 2/2002 | Tung | |
| 6,589,395 B1 | 7/2003 | Meili | |
| 6,645,350 B1 | 11/2003 | Steacy | |
| 6,958,111 B2 | 10/2005 | Rust et al. | |
| 7,090,748 B2 | 8/2006 | Kaibel et al. | |
| 7,264,696 B2 | 9/2007 | Kaibel et al. | |
| 7,266,948 B2 | 9/2007 | Spoelstra | |
| 7,619,126 B2 * | 11/2009 | Heida | 585/615 |
| 7,691,239 B2 * | 4/2010 | Kister et al. | 203/2 |
| 7,981,256 B2 * | 7/2011 | Wegerer et al. | 203/26 |
| 2006/0264678 A1 * | 11/2006 | Heydrich et al. | 568/600 |
| 2009/0114524 A1 * | 5/2009 | Sechrist | 203/98 |
| 2010/0101930 A1 * | 4/2010 | Sechrist et al. | 203/27 |

* cited by examiner

*Primary Examiner* — Virginia Manoharan
(74) *Attorney, Agent, or Firm* — KBR IP Legal Dept.

(57) ABSTRACT

Systems and methods for separating a multi-component fluid are provided. The method can include introducing a multi-component fluid to a dividing wall column. The multi-component fluid can be heated to provide a first product, a second product, an intermediate distillate, and a process fluid. At least a portion of the first product can be compressed to provide a compressed first product. Heat can be indirectly transferred from the compressed first product to at least a portion of the intermediate distillate to provide a heated intermediate distillate. The heated intermediate distillate can be recycled to the dividing wall column. The compressed first product can be expanded.

22 Claims, 5 Drawing Sheets

DIVIDING WALL COLUMN WITH A HEAT PUMP

CROSS REFERENCE TO RELATED APPLICATION

This application claims the benefit of U.S. Provisional Patent Application having Ser. No. 61/109,736, filed on Oct. 30, 2008, which is incorporated by reference herein.

BACKGROUND OF THE INVENTION

1. Field of the Invention

Embodiments of the present invention generally relate to systems and methods for hydrocarbon processing. More particularly, embodiments of the present invention relate to systems and methods for fractionating a multi-component fluid.

2. Description of the Related Art

Distillation columns or fractionators are typically vertical vessels operated at certain conditions and pressures suitable to separate a feed mixture into two or more fractions. Such fractions are typically removed from the top, i.e. the lights and from the bottom of the column, i.e. the heavies. The fractionation of multi-component mixtures having more than two components is typically adapted to remove liquid and gaseous products from the side of the column. However, such side products typically contain proportions of the low-boiling components which are normally taken off at the top and/or proportions of the higher-boiling components which are normally taken off at the bottom. To isolate intermediate-boiling substances from multi-component mixtures, multiple columns are typically used. An advantageous alternative is to use a dividing wall column.

In a dividing wall column, a dividing wall is located within the column. The dividing wall typically extends some distance above and below the side feed entry point of the column. On the side of the dividing wall opposite to the feed introduction point at least one intermediate product draw is located. The dividing wall prevents the lateral mixing of the feed and the fraction removed via the intermediate product draw on the opposite side of the dividing wall. The fraction removed via the intermediate product draw advantageously has a higher concentration of lower boiling point components than similar fractionation or distillation columns operated without the dividing wall. Exemplary dividing wall columns are described in U.S. Pat. Nos. 2,471,134; 5,755,933; 5,914,012; 6,347,533; 6,645,350; and 6,958,111.

A disadvantage of all distillation columns, including dividing wall columns, is that heat recovery from the overhead product is difficult if not impossible. The temperature of the overhead removed from the column is lower than the temperature at the base or bottom of the column. Although recovery of at least a portion of the heat in the overhead is desirable, the temperature of the overhead precludes direct heat exchange with the bottom.

There is a need, therefore, for a dividing wall column and fractionation system using the same that has improved heat recovery.

BRIEF DESCRIPTION OF THE DRAWINGS

So that the recited features of the present invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
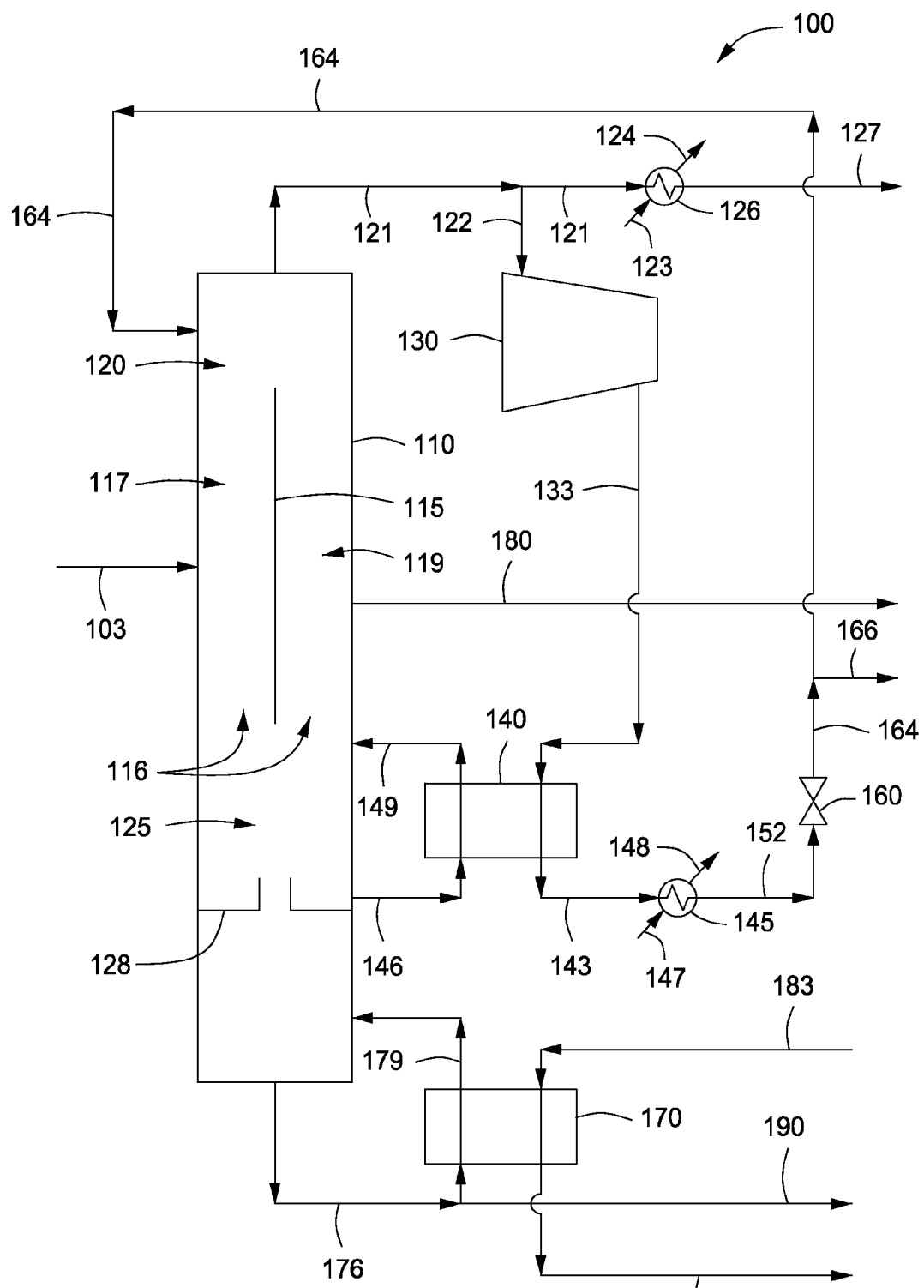
FIG. 1 depicts an illustrative system for fractionating a multi-component fluid using a fractionation column and an open-loop heat pump system, according to one or more embodiments described.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions, when the information in this patent is combined with available information and technology.

Systems and methods for separating a multi-component fluid are provided. In one or more embodiments, the method can include introducing a multi-component fluid to a dividing wall column. The multi-component fluid can be heated to provide a first product, a second product, an intermediate distillate, and a process fluid. At least a portion of the first product can be compressed to provide a compressed first product. Heat can be indirectly transferred from the compressed first product to at least a portion of the intermediate distillate to provide a heated intermediate distillate. The heated intermediate distillate can be recycled to the dividing wall column. The compressed first product can be expanded.

In one or more embodiments, the system can include a fractionation column having one or more dividing walls disposed therein and one or more heat pumps. As used herein, the term "fractionation column" can refer to any system, device, or combination of systems and/or devices suitable for the selective separation of a mixture containing two or more components having differing boiling points. Such fractionation columns can include, but are not limited to, dividing wall columns, distillation columns, rectification columns, stripping columns, and the like.

As used herein, the term "dividing wall" refers to any partition disposed within an interior of a column to provide a first fractionation zone on one side of the wall and a second fractionation zone on the other side of the wall. The dividing wall can be either segmented or continuous. The dividing wall can be parallel or non-parallel relative to the longitudinal axis of the column. The first fractionation zone and the second fractionation zone can have the same or different cross-sectional areas, volumes, or both. In one or more specific embodiments, the column can have a circular cross-section and the dividing wall can bisect the cross-section of the column to provide equal cross-sectional areas within the first fractionation zone and the second fractionation zone.

As used herein, the term "heat pump" refers to any thermo-mechanical heat transfer system using a compressible fluid to convey thermal energy from one or more heat sources to one or more heat sinks. The compressible fluid can include one or more process fluids from a column that is an "open loop" heat pump system. The compressible fluid can also include one or more circulated heat transfer mediums independent of the column that is a "closed loop" heat pump system.

FIG. 1 depicts an illustrative system 100 for fractionating a multi-component fluid using a dividing wall column and an open-loop heat pump system, according to one or more embodiments. The system 100 can include, but is not limited to, one or more fractionation columns 110, one or more compressors 130, one or more heat exchange zones (four are shown 126, 140, 145, 170) and one or more expansion valves 160. The fractionation column 110 can include a shell or housing disposed at any angle, in any configuration, and/or having any length to diameter (L/D) ratio. For clarity and ease of description, the fractionation column 110 will be further described with reference to a vertical, cylindrical, fractionation column 110 having an L/D ratio of greater than 1.

The shell or housing of the fractionation column 110 can define two or more sections or volumes therein. For example, three sections are depicted in FIG. 1, namely a first ("rectification") section 120, a second ("fractionating") section 116, and third ("stripping") section 125. The rectification section 120 can be disposed at a first end of the fractionation column 110 and the stripping section 125 can be disposed at a second end of the fractionation column 110. The fractionating section 116 can be disposed between the rectification section 120 and the stripping section 125, with each section in fluid communication with one another.

The fractionating section 116 can be divided by a dividing wall 115 disposed within the fractionation section 116. The dividing wall 115 can provide two independent fractionation zones within the fractionating section 116, namely, a first fractionation zone 117 and a second fractionation zone 119. The dividing wall 115 can be disposed within the fractionating section 116 such that the first fractionation zone 117 and the second fractionation zone 119 are of equal or unequal cross-sectional area. For example, the dividing wall 115 can bisect the cross-section of the fractionation section 116 such that the first fractionation zone 117 and the second fractionation zone 119 are of equal cross-sectional area.

In one or more embodiments, the dividing wall 115 can be a continuous or a segmented wall, baffle, or divider. In one or more embodiments, the dividing wall 115 can be non-insulated, partially insulated, or completely insulated. In one or more embodiments, the dividing wall 115 can be parallel with a longitudinal axis of the fractionation column 110, non-parallel with a longitudinal axis of the fractionation column 110, or a combination thereof.

The first fractionation zone 117 and the second fractionation zone 119 can be empty, partially filled, or completely filled with one or more trays and/or packing to improve mass transfer and/or separation of a multi-component fluid. The fill material and fill pattern in the first fractionation zone 117 and the second fractionation zone 119 can be the same or different. For example, the fill material in the first fractionation zone 117 can include one or more structured and/or random packed materials while the fill material in the second fractionation zone 119 can include one or more trays. Two or more types of fill material can be disposed within the first fractionation zone 117 and/or the second fractionation zone 119. For example, the first fractionation zone 117 can contain random dumped packing beneath a feed introduction line or column inlet 103 and one or more trays above the column inlet 103. One or more chimney trays or other liquid trap-out device can be disposed in the second fractionation zone 119 to improve or aid in the withdrawal of a second product via line 180.

As used herein, the term "trays" can include, but is not limited to, one or more types of trays that can improve the contact between gas and liquid phases within a fractionation column 110. Illustrative trays can include, but are not limited to perforated trays, sieve trays, bubble cap trays, floating valve trays, fixed valve trays, tunnel trays, cartridge trays, dual flow trays, baffle trays, shower deck trays, disc and donut trays, orbit trays, horse shoe trays, cartridge trays, snap-in valve trays, chimney trays, slit trays, or any combination thereof As used herein, the term "packing material" can include, but is not limited one or more types of structured and/or random shaped material disposed within the fractionation column 110. The packing material can increase the effective surface area within the fractionation column 110, which can improve the mass transfer between liquid and gas phases within the fractionation column 110. The packing material can be made of any suitable material, for example metals, non-metals, polymers, ceramics, glasses, or any combination thereof. Illustrative examples of random packing material can include but is not limited to, Raschig rings, Lessing rings, I-rings, saddle rings, Intalox saddles, Tellerettes, Pall rings, U-rings, or any combination thereof. Illustrative examples of commercially available structured packing can include, but is not limited to, structured packing, corrugated sheets, crimped sheets, gauzes, grids, wire mesh, monolith honeycomb structures, or any combination thereof. For example, suitable structured packing can include FLEXIPAC and GEMPAK structured packing manufactured by the Koch-Glitsch Corporation The fractionation column 110 can be made of one or more metallic and/or non-metallic materials physically and chemically compatible with the temperature, pressure, and contents of the fractionation column 110. Suitable metallic materials can include, but are not limited to ferrous alloys including carbon and stainless steels, and non-ferrous alloys such as aluminum, nickel, HASTELLOY, INCONEL, INCALLOY, tantalum, and the like.

The stripping section 125 can be empty, partially filled, or completely filled with one or more trays and/or packing. One or more fluid connections, four are shown 146, 149, 176 and 179, can be disposed in, on, or about the stripping section 125 for circulating fluids within the stripping section 125 to/from the heat exchange zone 140 and/or the exchange zone 170.

The first fractionation zone 117 and the second fractionation zone 119 can be in fluid communication at a second end with the rectification section 120. The rectification section 120 can be empty, partially filled, or completely filled with one or more trays and/or packing. In one or more embodiments, one or more fluid connections, two are shown 121 and 164, can be disposed in, on, or about the rectification section 120 for the introduction of an external reflux via line 164 to the rectification section 120 and the removal of a first product via line 121 from the rectification section 120.

In one or more embodiments, the fractionation column 110 can be operated at a temperature ranging from a low of about −200° C., about −100° C., about −50° C., about 0° C., or about 50° C. to a high of about 100° C., about 300° C., about 500° C., about 700° C., or about 1,000° C. The fractionation column 110 can be operated at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, or about 3,000 kPa.

The sections (120, 117, 119, 125) of the fractionation column 110 can be operated at different temperatures. For example, the rectification section 120 can be operated at a temperature lower than the first fractionation zone 117, the second fractionation zone 119, and the stripping section 125. In one or more embodiments, the first fractionation zone 117 and the rectification section 120 can be operated at the same temperature or about the same temperature, for example within 10° C., which can be lower than the second fractionation zone 119 and the stripping zone 125. In one or more embodiments, the second fractionation zone 119 can be operated at a temperature greater than the rectification section 120 and the first fractionation zone 117, but at a temperature less than the stripping section 125. In one or more embodiments, the stripping section 125 can be operated at a temperature greater than the rectification section 120, the first fractionation zone 117, and the second fractionation zone 119. A greater temperature variation between the first fractionation zone 117 and the second fractionation zone 119 can be provided, at least in part, by an at least partially insulated dividing wall 115.

The rectification section 120 can be operated at a first temperature ("$T_1$"), the first fractionation zone 117 can be operated at a second temperature ("$T_2$"), the second fractionation zone 119 can be operated at a third temperature ("$T_3$"), and the stripping section 125 can be operated at a fourth temperature ("$T_4$"). In one or more embodiments, $T_1$ can be less than $T_2$, $T_2$ can be less than $T_3$, and $T_3$ can be less than $T_4$. In one or more embodiments, the temperature between $T_1$ and $T_2$ can differ by less than about 50° C., less than about 30° C., less than about 15° C., less than about 10° C., less than about 5° C., or less than about 1° C. In one or more embodiments, $T_3$ can be greater than $T_1$ and $T_2$, but less than $T_4$. In one or more embodiments, $T_3$ can be about 5° C., about 10° C., about 15° C., about 30° C., about 50° C. or more, greater than $T_2$ and/or $T_1$. In one or more embodiments, $T_4$ can be about 5° C., about 10° C., about 15° C., about 30° C., about 50° C. or more, greater than $T_3$.

A multi-component fluid via line 103 can be introduced to the fractionation column 110. The fractionation column 110 can separate the multi-component fluid to provide a first product via line 121, a second product via line 180, and a process fluid via line 176, as illustrated. Any suitable multi-component fluid via line 103 can be introduced to the fractionation column 110. Suitable multi-component fluids can include, but are not limited to hydrocarbon compounds containing any combination and/or amount of $C_1$-$C_{20}$ hydrocarbons. Other multi-component fluids can include mixtures containing hydrocarbons, nitrogen, hydrogen, oxygen, argon, helium, water, oil, or any mixture thereof. An illustrative example of a multi-component hydrocarbon that can be introduced via line 103 can include ethane, ethylene, and $C_3$+ hydrocarbons. Ethane can be recovered via line 180 as the second product, ethylene can be recovered via line 121 as the first product and a $C_3$+ process fluid can be recovered via line 176 as the third product. In at least one specific embodiment, the system 100 can separate a multi-component hydrocarbon comprising n-butane, iso-butane, and $C_5$+ hydrocarbons to provide iso-butane via line 121 as a first product, n-butane via line 180 as a second product, and a $C_5$+ process fluid via line 176, which can be recovered as a third product.

In one or more embodiments, the first product in line 121 can include about 90% mol, about 95% mol, about 97% mol, about 98% mol, about 99% mol, or about 99.5% mol or more of a single component of a multi-component fluid introduced via line 103 to the fractionation column 110. In one or more embodiments, the second product in line 180 can include about 90% mol, about 95% mol, about 97% mol, about 98% mol, about 99% mol, or about 99.5% mol or more of a single component of a multi-component fluid introduced via line 103 to the fractionation column 110. In one or more embodiments, the second product in line 180 can have a boiling point greater than the first product recovered via line 121. In one or more embodiments, the process fluid in line 176 can include the balance of a multi-component fluid introduced via line 103 to the fractionation column 110. In one or more embodiments, the process fluid in line 176 can have a boiling point greater than the first product recovered via line 121 and the second product recovered via line 180. In one or more embodiments, the process fluid in line 176 can be a fully purified product having up to about 90% mol, about 95% mol, about 97% mol, about 98% mol, about 99% mol, or about 99.5% mol or more of a single component of a multi-component fluid introduced via line 103 to the fractionation column 110.

In one or more embodiments, at least a portion of the first product via line 121 can be introduced to the heat exchange zone 126 to provide a cooled first product via line 127. Heat can be transferred within the heat exchange zone 126 from the first product introduced via line 121 to a heat transfer medium introduced via line 123 to provide the cooled first product via line 127 and a warmed heat transfer medium via line 124. Heat from the first product introduced via line 121 can be indirectly transferred or directly transferred to the heat exchange medium introduced via line 123. The heat transfer medium can be any suitable heat exchange medium. Illustrative heat transfer mediums introduced via line 123 to the heat transfer zone 126 can include, but are not limited to, air, water, liquid hydrocarbons, gaseous hydrocarbons, and/or boiling hydrocarbons.

In one or more embodiments, the cooled first product via line 127 can be recovered as a final first product. In one or more embodiments, at least a portion of the cooled first product via line 127 can be recycled back to the rectification section 120 (not shown). In one or more embodiments, the cooled first product via line 127 can be introduced to an accumulator or separator (not shown) to provide a liquid phase first product and a gaseous phase first product. At least a portion of the gaseous phase first product can be recovered as a final product and at least a portion of the liquid first product can be recycled to the rectification section 120.

At least a portion of the first product in line 121 can be used as the heat transfer medium within the open-loop heat pump system. At least a portion of the first product via line 122 can be introduced to the compressor 130 to provide a high pressure first product via line 133. At least a portion of the first product via line 122 can be condensed within the compressor 130. For example, the compressor 130 can include two or more stages of compression with one or more interstage coolers disposed intermediate two compression stages.

The high pressure first product in line 133 can be at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, or about 3,000 kPa. In one or more embodiments, about 5% wt, about 25% wt, about 50% wt, about 75% wt, about 90% wt, or about 95% wt or more of the first product in line 122 can be condensed within the compressor 130. The temperature of the first product in line 122 can increase within the compressor 130. The temperature rise of the first product within the compressor 130 can be about 5° C., about 10° C., about 25° C., about 50° C., about 100° C., about 150° C., or about 200° C. or more. In one or more embodiments, the first product in line 122 can be pre-heated in one or more optional heat exchange zones or "superheaters" (not shown) prior to compressing and/or after compressing the first product in line 122 to provide a first product in line 133 at a higher temperature than provided only by the one or more compressors 130.

The compressor 130 can be driven using a mechanical driver such as a steam or gas turbine. The compressor 130 can be driven using an electrical driver, for example an enclosed electric motor. The compressor 130 can be driven with a combination of mechanical and/or electrical drivers, for example a steam turbine backed by a stand-by electric motor.

The temperature of the high pressure first product in line 133 can be greater than the temperature of an intermediate distillate withdrawn via line 146 from the stripping section 125. The temperature of the high pressure first product in line 133 can be greater than the boiling point of the intermediate distillate recovered via line 146 from the fractionation column 110. In one or more embodiments, the temperature of at least a portion of the intermediate distillate recovered via line 146 can be increased in the heat exchange zone 140 by indirectly transferring heat from the high pressure first product introduced via line 133 to the intermediate distillate introduced via line 146. In one or more embodiments, as the intermediate distillate in line 146 approaches a pure product composition, e.g. a single component, the increase in temperature of the heated intermediate distillate in line 149 relative to the temperature of the intermediate distillate in line 146 will decrease. For example, an intermediate distillate in line 146 having a pure product composition can have a minimal or even non-measurable rise in temperature after exchanging heat within the heat exchange zone 140 because, rather than increasing the temperature of the intermediate distillate, at least a portion of the intermediate distillate can be vaporized. A first cooled first product or cooled first product via line 143 and a heated intermediate distillate via line 149 can be recovered from the heat exchange zone 140. In one or more embodiments, one or more chimney trays 128 or other liquid trap-out device can be disposed within the stripping section 125 to provide the intermediate distillate fraction via line 146 from the stripping section 125. The heated intermediate distillate fraction via line 149 can be recycled to the stripping section 125.

In one or more embodiments, at least a portion of the intermediate distillate in line 146 can be vaporized within the heat exchange zone 140. For example, about 5% wt, about 10% wt, about 25% wt, about 50% wt, about 75% wt, about 90% wt, about 95% wt, about 99% wt or more of the intermediate distillate fraction in line 146 can be vaporized in the heat exchange zone 140. The temperature of the intermediate distillate fraction in line 146 can be increased by about 5° C., about 10° C., about 25° C., about 50° C., about 75° C., about 100° C., about 150° C., or about 200° C. The partially or completely vaporized intermediate distillate via line 149 can be recycled to the fractionation column 110. The partially or completely vaporized intermediate distillate can be recycled via line 149 to the stripping section 125.

The cooled first product via line 143 can be introduced to the heat exchange zone 145 to provide a second cooled first product or cooled first product via line 152. Heat can be transferred within the heat exchange zone 145 from the cooled first product introduced via line 143 to a heat transfer medium introduced via line 147 to provide the cooled first product via line 152 and a heated heat transfer medium via line 148. Heat from the cooled first product introduced via line 143 can be indirectly transferred to the heat exchange medium introduced via line 147. In one or more embodiments, at least a portion of the cooled first product in line 143 can be condensed within the heat exchange zone 145. For example, about 5% wt, about 10% wt, about 25% wt, about 50% wt, about 75% wt, about 90% wt, about 95% wt, about 99% wt or more of the cooled first product in line 143 can be condensed in the heat exchange zone 140. The heat transfer medium introduced via line 147 can be any suitable heat exchange medium. Illustrative heat transfer mediums introduced via line 147 to the heat transfer zone 126 can include, but are not limited to, air, water, liquid hydrocarbons, gaseous hydrocarbons, and/or boiling hydrocarbons.

The heat exchange zone 140 can include one or more systems, devices, or any combination of systems and/or devices suitable for exchanging heat between two or more fluids. The heat exchange zone 140 can include one or more shell-and-tube exchangers, plate-and-frame exchangers, U-tube exchangers, bent-tube exchangers, bayonet-tube exchangers, spiral wound exchangers, falling-film exchangers or any combination thereof.

The heat exchange zone 140 can be operated at a temperature ranging from a low of about −200° C., about −100° C., about −50° C., about 0° C., or about 50° C. to a high of about 100° C., about 300° C., about 500° C., about 700° C., or about 1,000° C. The heat exchange zone 140 can be operated at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, or about 3,000 kPa.

The cooled first product in line 152 can be expanded by flowing through one or more expansion valves 160 to provide a third cooled first product or cooled first product via line 164. In one or more embodiments, a portion of the cooled first product introduced via line 152 to the one or more expansion valves 160 can flash or vaporize to provide a two-phase cooled first product in line 164. For example, about 5% wt, about 10% wt, about 25% wt, about 50% wt, about 75% wt, about 90% wt, about 95% wt, about 99% wt or more of the cooled first product in line 152 can be vaporized by flowing through the one or more expansion valves 160.

All or a portion of the cooled first product in line 164 can be recycled via line 164 as a reflux to the rectification section 120. In one or more embodiments, about 5% wt, about 10% wt, about 25% wt, about 50% wt, about 75% wt, about 90% wt, about 95% wt, about 99% wt, or more of the cooled first product via line 164 can be recycled as a reflux to the rectification section 120. In one or more embodiments, at least a portion of the first product in line 164 can be recovered via line 166 as a final product. In one or more embodiments, the amount of the first product recycled via line 164 to the rectification section 120 can remain constant or can vary. In one or more embodiments, at least a portion of the first product in line 166 can be mixed or otherwise combined with at least a portion of the first product recovered via line 127.

Although not shown, in one or more embodiments, the one or more expansion valves 160 can be replaced by one or more expanders having a work output. For example, the one or more expansion valves 160 can be replaced by one or more fluid expanders having a work output. The work output provided by the one or more fluid expanders can be used to generate electricity via one or more generators (not shown). In another example the work output provided by the one or more fluid expanders can be used to help drive the compressor 130 by direct mechanical connection (not shown).

In one or more embodiments, a process fluid via line 176 can be recovered from a bottom zone or section of the stripping section 125. In one or more embodiments, at least a portion of the process fluid via line 176 can be introduced to the heat exchange zone 170 to provide a heated process fluid via line 179, which can be recycled to the stripping section 125. In one or more embodiments, as the process fluid in line 176 approaches a pure product composition, e.g. a single component, the increase in temperature of the heated process fluid in line 179 relative to the temperature of the process fluid in line 176 will decrease. For example, a process fluid in line 176 having a pure product composition can have a minimal or even non-measurable rise in temperature after exchanging heat within the heat exchange zone 170. Heat can be indirectly transferred from a heat transfer medium introduced via line 183 to the process fluid introduced via line 176 to provide the heated process fluid via line 179 and a cooled heat transfer medium via line 186. In one or more embodiments, at least a portion of the process fluid introduced via line 176 to the heat exchange zone 170 can be vaporized. About 5% wt, about 10% wt, about 25% wt, about 50% wt, about 75% wt, about 90% wt, about 95% wt, about 99% wt, of the process fluid in line 176 can be vaporized. In one or more embodiments, at least a portion of the process fluid in line 176 can be recovered via line 190 as the third or final product. In one or more embodiments, about 5% wt, about 10% wt, about 25% wt, about 50% wt, about 75% wt, about 90% wt, or about 95% wt or more of can be recovered as a third product via line 190.

The heat exchange zone 170 can include any system, device, or any combination of systems and/or devices for exchanging heat between two or more fluids. In one or more embodiments, the heat exchange zone 170 can include one or more shell-and-tube exchangers, plate-and-frame exchangers, U-tube exchangers, bent-tube exchangers, bayonet-tube exchangers, spiral wound exchangers, falling-film exchangers or any combination thereof. In one or more embodiments, the heat exchange zone 170 can be a direct fired heater.

In one or more embodiments, a heat transfer medium via line 183 can be introduced to the heat exchange zone 170, which can transfer heat to the process fluid introduced via line 176. The heat transfer medium in line 183 can include, but is not limited to, water, steam, process fluids, exhaust gases, heat transfer oils or hydrocarbons, or any combination thereof. The heat transfer medium in line 183 can be at any suitable pressure and temperature which can depend upon the operating requirements of the system 100. In one or more embodiments, the heat exchange zone 170 can be a direct fired heater.

The heat exchange zone 170 can be operated at a temperature ranging from a low of about −200° C., about −100° C., about −50° C., about 0° C., or about 50° C. to a high of about 100° C., about 300° C., about 500° C., about 700° C., or about 1,000° C. The heat exchange zone 170 can be operated at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, or about 3,000 kPa.

Figure 2:
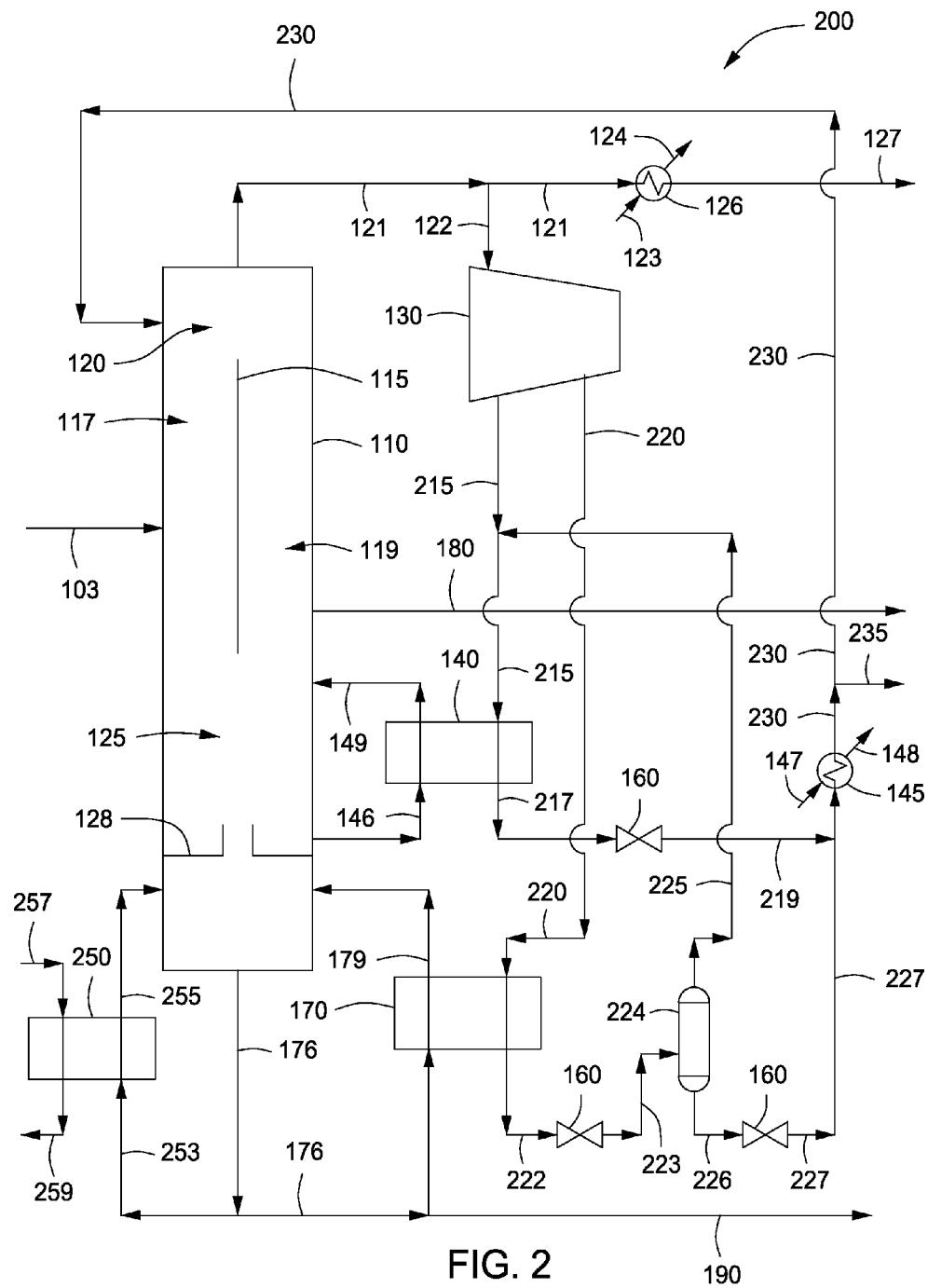
FIG. 2 depicts another illustrative system for fractionating a multi-component fluid using a fractionation column and an open-loop heat pump system, according to one or more embodiments described.

FIG. 2 depicts another illustrative system 200 for fractionating a multi-component fluid using a dividing wall column and an open-loop heat pump system, according to one or more embodiments. The system 200 can include, but is not limited to, a fractionation column 110, one or more compressors 130, one or more heat exchange zones (five are shown 126, 140, 145, 170, 250), and one or more expansion valves 160 (three are shown), which can be similar to those discussed and described above with reference to FIG. 1. In one or more embodiments, the system 200 can further include one or more flash separators 224.

A multi-component fluid, which can be as discussed and described above with reference to FIG. 1, can be introduced via line 103 to the fractionation column 110. In one or more embodiments, a first product via line 121, a second product via line 180, and a process fluid via line 176 can be recovered from the fractionation column 110 as discussed and described above with reference to FIG. 1.

At least a portion of the first product via line 121 can be recovered from the rectification section 120 and introduced to the heat exchange zone 126 to provide a cooled first product via line 127. At least a portion of the first product via line 122 can be introduced to the compressor 130 to provide a high pressure first product via line 215 at a first temperature and a first pressure and a high pressure first product via line 220 at a second temperature and a second pressure. In one or more embodiments, the first temperature in line 215 can be less than or equal to the second temperature in line 220. In one or more embodiments, the first pressure in line 215 can be less than or equal to the second pressure in line 220. In one or more embodiments, two or more compressors can be used to provide the high pressure first product in line 215 and the high pressure first product in line 220. The high pressure first product via line 215 can be introduced to the heat exchange zone 140, where heat can be indirectly transferred to the intermediate distillate introduced via line 146 to provide a heated distillate via line 149 and a first cooled high pressure first product or cooled first product via line 217. The high pressure first product via line 220 can be introduced to the heat exchange zone 170, where heat can be indirectly transferred to the process fluid introduced via line 176 to provide a heated process fluid via line 179 and a first cooled high pressure first product or cooled first product via line 222.

As discussed above, the compressor 130 can include two or more compression stages with one or more interstage coolers disposed between two compression stages. As such, in one or more embodiments, about 5% wt, about 25% wt, about 50% wt, about 75% wt, about 90% wt, about 95% wt, or more of the first product in line 122 can be condensed within the compressor 130. The temperature of the first product in line 122 can increase within the compressor 130. In one or more embodiments, the temperature rise of the high pressure first product recovered via line 215 can be about 5° C., about 10° C., about 25° C., about 50° C., about 100° C., about 150° C., or about 200° C. or more. In one or more embodiments, the temperature rise of the high pressure first product recovered via line 220 can be about 5° C., about 10° C., about 25° C., about 50° C., about 100° C., about 150° C., or about 200° C.

In one or more embodiments, the high pressure first product in line 215 can be at a temperature above the boiling point of the fluid recovered via line 146 from the stripping section 125. At least a portion of the high pressure first product in line 215 can be used to vaporize all or a portion of the fluid introduced via line 146 to the heat exchange zone 140. For example, about 5% wt, about 10% wt, about 25% wt, about 50% wt, about 75% wt, about 90% wt, about 95% wt, about 99% wt, or more of the fluid introduced via line 146 can be vaporized in the heat exchange zone 140, which can be returned via line 149 to the stripping section 125.

In one or more embodiments, the high pressure first product in line 220 can be at a temperature above the boiling point of a process fluid recovered via line 176 from the stripping section 125. At least a portion of the high pressure first product in line 220 can be used to vaporize all or a portion of the process fluid introduced via line 176 to the heat exchange zone 170. For example, about 5% wt, about 10% wt, about 25% wt, about 50% wt, about 75% wt, about 90% wt, about 95% wt, about 99% wt, or more of the process fluid introduced via line 176 can be vaporized in the heat exchange zone 170, which can be recycled via line 179 to the stripping section 125. The use of the high pressure first product in line 220 within the heat exchange zone 170 can reduce and/or eliminate the need for one or more externally supplied heat transfer mediums. The use of the high pressure first product in line 220 to heat the heat exchange zone 170 can therefore, further improve the overall energy efficiency of the system 200.

Although not shown, in one or more embodiments, the first product in line 122 and/or the high pressure first product in line 215 and/or the high pressure first product in line 220 can be pre-heated and/or further heated in one or more optional heat exchange zones or superheaters to provide a high pressure first product in line 215 and/or line 220 at a higher temperature than provide by the one or more compressors 130. Although not shown in one or more embodiments, the compressor 130 can provide a heat transfer medium via line 220, which can be introduced serially to the heat exchange zone 170 and the heat exchange zone 140. For example, the high pressure first product in line 220 can be introduced to the heat exchange zone 170, which can provide a first cooled high pressure first product in line 222 and the first cooled high pressure first product in line 222 can then be introduced to the heat exchange zone 140 to provide a second cooled high pressure first product.

The high pressure first product in line 222 can be expanded by flowing through the expansion valve 160 to provide a first cooled first product or cooled first product via line 223. In one or more embodiments, at least a portion of the first product in line 222 can be flashed or vaporized by flowing through the one or more expansions valves 160. For example, about 5% wt, about 10% wt, about 25% wt, about 50% wt, about 75% wt, about 90% wt, about 95% wt, about 99% wt, or more of the first product in line 222 can be vaporized by flowing through the one or more expansion valves 160.

The cooled first product via line 223 can be introduced to the flash separator 224 to provide a gaseous phase first product via line 225 and a liquid phase or condensed first product via line 226. The gaseous phase first product via line 225 can be introduced to the high pressure first product in line 215. The gaseous phase first product via line 225 can be introduced directly to the heat exchanger 140, rather than to high pressure first product in line 215.

The condensed first product in line 226 can be introduced to the expansion valve 160 to provide a further cooled and/or further depressurized first product via line 227. At least a portion of the high pressure first product in line 217 can be expanded by flowing through the expansion valve 160 to provide a cooled first product via line 219. In one or more embodiments, about 5% wt, about 10% wt, about 25% wt, about 50% wt, about 75% wt, about 90% wt, about 95% wt, about 99% wt, or more of the high pressure first product in line 217 can be flashed or vaporized by flowing through the one or more expansion valves 160.

All or a portion of the cooled first product in line 219 can be mixed or otherwise combined with the cooled first product in line 227. The cooled first product in line 219, the cooled first product in line 227, or the combined first product from lines 219 and 227 (as shown) can be introduced to the heat exchanger 145 to provide a cooler first product via line 230. A heat transfer medium via line 147 can be introduced to the heat exchanger 145, which can be recovered via line 148. Heat can be indirectly transferred from the first product introduced via line 219, the first product introduced via line 227, or the combined mixture thereof to the heat transfer medium introduced via line 147.

All or a portion of the first product via line 230 can be recycled as a reflux to the rectification section 120 and/or recovered as a first product via line 235. For example, about 5% wt, about 10% wt, about 25% wt, about 50% wt, about 75% wt, about 90% wt, about 95% wt, about 99% wt, or more of the first product in line 219 can be recovered as a final produce via line 235. The amount of the first product returned via line 230 to the rectification section 120 can remain constant or can vary.

Although not shown, in one or more embodiments, one or more of the expansion valves 160 can be replaced by one or more expanders having a work output. For example, one or more of the expansion valves 160 can be replaced by one or more fluid expanders having a work output. The work output provided by the one or more fluid expanders can be used to generate electricity via one or more generators (not shown). In another example the work output provided by the one or more fluid expanders can be used to help drive the compressor 130 by direct mechanical connection (not shown).

In one or more embodiments, an optional supplemental heat exchange zone 250 can provide additional or supplemental heat to the stripping section 125. For example, at least a portion of the process fluid in line 176 can be introduced via line 253 to the heat exchange zone 250. Depending on the process conditions and system requirements, the optional heat exchange zone 250 can be used to provide heat to at least a portion of the process fluid recovered via line 176 and or line 146 (not shown). In one or more embodiments, a heat transfer medium via line 257 can be introduced to the heat exchange zone 250, which can indirectly transfer heat to the process fluid introduced via line 253 to provide a heated process fluid via line 255 and a cooled heat transfer medium via line 259. The heated fluid can be recycled via line 255 to the stripping section 125. In one or more embodiments, at least a portion of the process fluid introduced via line 253 to the heat exchange zone 250 can be vaporized within the heat exchange zone 250. For example, about 5% wt, about 10% wt, about 25% wt, about 50% wt, about 75% wt, about 90% wt, about 95% wt, about 99% wt, or more of the process fluid in line 253 can be vaporized within the heat exchange zone 250 and recycled via line 255 to the stripping section 125.

The heat transfer medium in line 257 can include, but is not limited to, water, steam, process fluids, exhaust gases, heat transfer oils or hydrocarbons, or any combination thereof. The heat transfer medium in line 257 can be at any suitable pressure and temperature which can depend upon the operating requirements of the system 200. The heat exchange zone 250 can include any system, device, or combination of systems and/or devices for increasing the temperature of the fluid introduced via line 253. For example, the supplemental heat exchange zone 250 can include one or more shell-and-tube exchangers, plate-and-frame exchangers, U-tube exchangers, bent-tube exchangers, bayonet-tube exchangers, spiral wound exchangers, falling-film exchangers or any combination thereof. In one or more embodiments, the supplemental heat exchange zone 250 can be a direct fired heater.

The supplemental heat exchange zone 250 can be operated at a temperature ranging from a low of about −200° C., about −100° C., about −50° C., about 0° C., or about 50° C. to a high of about 100° C., about 300° C., about 500° C., about 700° C., or about 1,000° C. The supplemental heat exchange zone 250 can be operated at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, or about 3,000 kPa.

Figure 3:
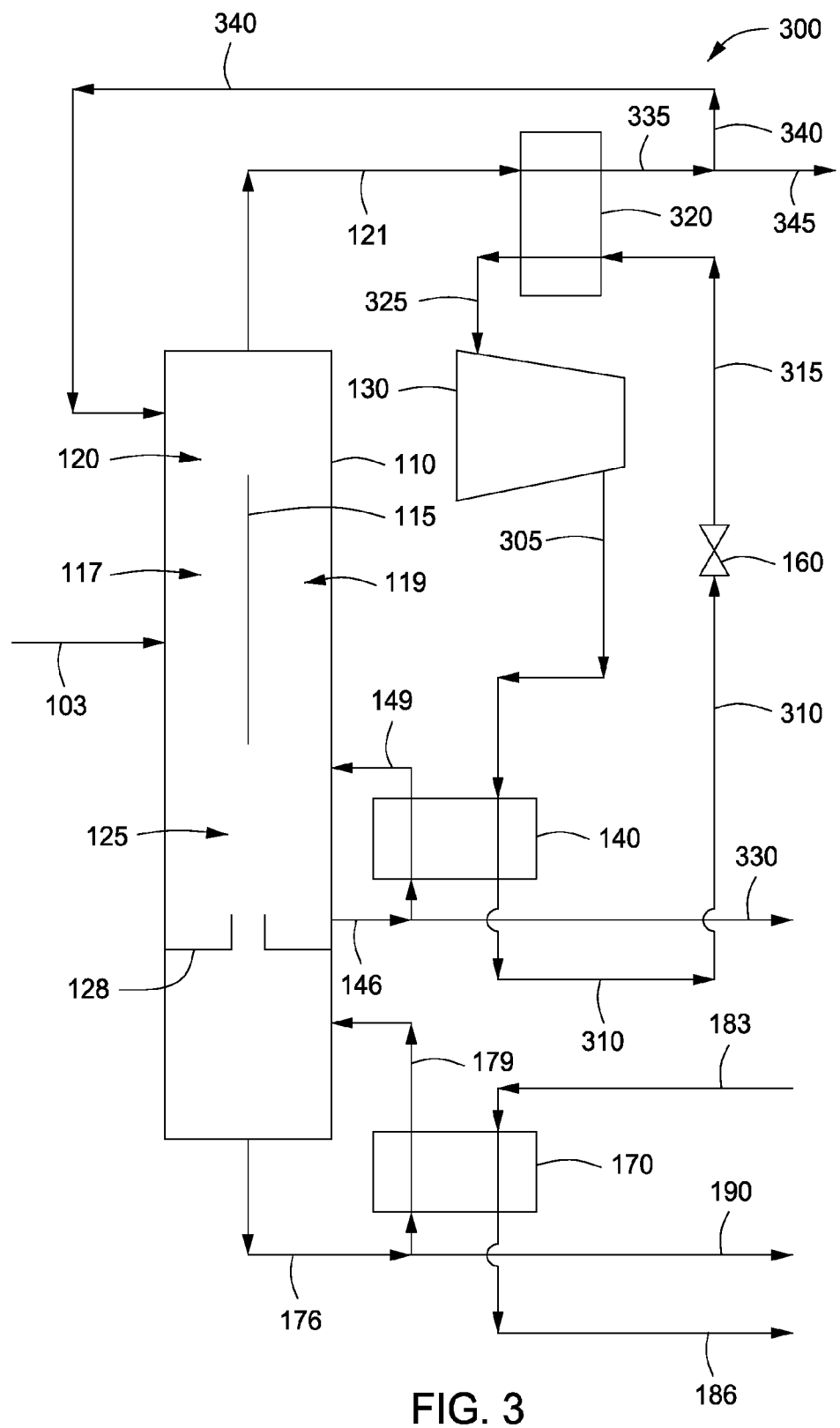
FIG. 3 depicts an illustrative system for fractionating a multi-component fluid using a fractionation column and a closed-loop heat pump system, according to one or more embodiments described.

FIG. 3 depicts an illustrative system 300 for fractionating a multi-component fluid using a dividing wall column and a closed-loop heat pump system, according to one or more embodiments. The illustrative system 300 can include, but is not limited to, one or more fractionation columns 110, one or more compressors 130, one or more heat exchange zones (three are shown 140, 170), and one or more expansion valves 160, which can be similar as discussed and described above with reference to FIGS. 1 and 2. The system 300 can include a recirculated, "closed-loop," heat transfer medium which can meet the heating and cooling needs of all or a portion of the fractionation column 110. As such, the system 300 can include one or more heat exchange zones 320, which can transfer heat to the recirculated heat transfer medium. In one or more embodiments, a multi-component fluid via line 103 can be introduced to the fractionation column 110. The fractionation column 110 can separate the multi-component fluid to provide a first product via line 121, an intermediate distillate via line 146, and a process fluid via line 176.

The heat transfer medium in the "closed loop" system can be one or more materials or compounds having properties suitable for the transfer of thermal energy to or from the first product in line 121, and/or the intermediate distillate via line 146, and/or the process fluid in line 176. The heat transfer medium can be any suitable hydrocarbon or any other suitable fluid. Illustrative heat transfer mediums can include, but are not limited to, hydrocarbons, halocarbons, gases such as nitrogen and steam, water, and mixtures thereof. In one or more embodiments, the heat transfer medium can have a boiling point, at heat transfer loop pressure, less than the boiling point of the first product in line 121, the intermediate distillate in line 146, and/or the process fluid in line 176.

The heat transfer medium via line 325 can be introduced to the compressor 130 to provide a compressed heat transfer medium at a first temperature and first pressure via line 305. Although not shown, in one or more embodiments, the heat transfer medium can be introduced to a separator prior to introduction to the one or more compressors 130 to remove at least a portion of any liquid to provide a gaseous heat transfer medium via line 325. At least a portion of the compressed heat transfer medium in line 305 can be introduced to the heat exchange zone 140. Although not shown, in one or more embodiments, the compressed heat transfer medium in line 305 can be introduced to one or more heat exchangers, intermediate the compressor 130 and the heat exchange zone 140, to provide a compressed heat transfer medium in line 305 having a higher temperature than provided by the one or more compressors 130.

In one or more embodiments, at least a portion of the intermediate distillate via line 146 can be introduced to the heat exchange zone 140. Within the heat exchange zone 140 heat can be indirectly transferred from the compressed heat transfer medium introduced via line 305 to the intermediate distillate introduced via line 146 to provide a heated distillate via line 149 and a cooled heat transfer medium via line 310. At least a portion of the intermediate distillate in line 146 can be recovered via line 330 as a second product. For example, about 5% wt, about 10% wt, about 25% wt, about 50% wt, about 75% wt, about 90% wt, about 95% wt, about 99% wt, or more of the intermediate distillate in line 146 can be recovered via line 330 as the second product, with the balance introduced to the heat exchange zone 140. Within the heat exchange zone 140, at least a portion of the intermediate distillate can be vaporized and recycled via line 149 to the stripping section 125. In one or more embodiments, about 5% wt, about 10% wt, about 25% wt, about 50% wt, about 75% wt, about 90% wt, about 95% wt, or about 99% wt or more of the intermediate distillate introduced via line 146 to the heat exchange zone 140 can be vaporized in the heat exchange zone 140. In one or more embodiments, as the intermediate distillate in line 146 approaches a pure product composition, e.g. a single component, the increase in temperature of the heated intermediate distillate in line 149 relative to the temperature of the intermediate in line 146 will decrease. For example, an intermediate distillate in line 146 having a pure product composition can have a minimal or even non-measurable rise in temperature after exchanging heat within the heat exchange zone 140.

The heat transfer medium recovered via line 310 from the heat exchange zone 140 can be expanded by flowing through the expansion valve 160. The expansion of the heat transfer medium can provide a cooled heat transfer medium via line 315. The pressure drop through the one or more expansion valves 160 can flash or vaporize all or a portion of the heat transfer medium in line 310. In one or more embodiments, about 5% wt, about 10% wt, about 25% wt, about 50% wt, about 75% wt, about 90% wt, about 95% wt, about 99% wt, or more of the heat transfer medium in line 310 can be vaporized by flowing through the one or more expansion valves 160. Although not shown, in one or more embodiments, the expansion valve 160 can be replaced by one or more expanders having a work output. For example, the one or more expansion valves 160 can be replaced by one or more fluid expanders having a work output. The work output provided by one or more fluid expanders can be used to generate electricity via one or more generators (not shown). In another example the work output provided by the one or more fluid expanders can be used to help drive the compressor 130 by direct mechanical connection (not shown).

The heat transfer medium in line 315 can be introduced to the one or more third heat exchange zones 320. Within the heat exchange zone 320, the temperature of the heat transfer medium can be increased by indirectly transferring heat from the first product introduced via line 121 to the heat transfer medium. In at least one specific embodiment, the heat transfer medium in line 315 can be a pure heat transfer medium, i.e. a single component. A pure heat transfer medium can be vaporized within the heat exchange zone 320 and can have little or no increase in temperature. The heat transfer medium via line 325 can be recovered from the heat exchange zone 320, which can be recycled to the compressor 130.

All or a portion of the first product in line 121 can be condensed within the heat exchange zone 320. For example, about 5% wt, about 10% wt, about 25% wt, about 50% wt, about 75% wt, about 90% wt, about 95% wt, about 99% wt, or more of the first product in line 121 can be condensed in the heat exchange zone 320. About 5% wt, about 10% wt, about 25% wt, about 50% wt, about 75% wt, about 95% wt, about 99% wt, or more of the first product in line 335 can be recycled via line 340 to the rectification section 120 of the fractionation column 110. About 5% wt, about 10% wt, about 25% wt, about 50% wt, about 75% wt, about 95% wt, about 99% wt, or more of the first product in line 335 can be recovered as a final first product via line 345. Although not shown, in one or more embodiments the first product in line 335 can be introduced to one or more heat exchangers for further cooling and/or one or more accumulators or separators to provide a liquid first product via line 335 and a gaseous product (not shown). The amount of the first product recycled via line 340 to the rectification section 120 can be constant or the amount can vary.

Although not shown, in one or more embodiments, the expanded heat transfer medium in line 315 can be introduced to an accumulator or separator to separate gaseous phase heat transfer medium from liquid phase heat transfer medium. The gaseous phase heat transfer medium from the separator can be introduced to the compressor 130 and the liquid phase heat transfer medium can be introduced to the heat exchange zone 320.

The heat exchange zone 320 can include one or more heat transfer systems, devices, or any combination of systems and/or devices for decreasing the temperature of the first product recovered via line 121 from the rectifying section 120. For example, the heat exchange zone 320 can include one or more shell-and-tube exchangers, plate-and-frame exchangers, U-tube exchangers, bent-tube exchangers, bayonet-tube exchangers, spiral wound exchangers, falling-film exchangers or any combination thereof. The heat exchange zone 320 can be operated at a temperature ranging from a low of about −200° C., about −100° C., about −50° C., about 0° C., or about 50° C. to a high of about 100° C., about 300° C., about 500° C., about 700° C., or about 1,000° C. The heat exchange zone 320 can be operated at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, or about 3,000 kPa.

Figure 4:
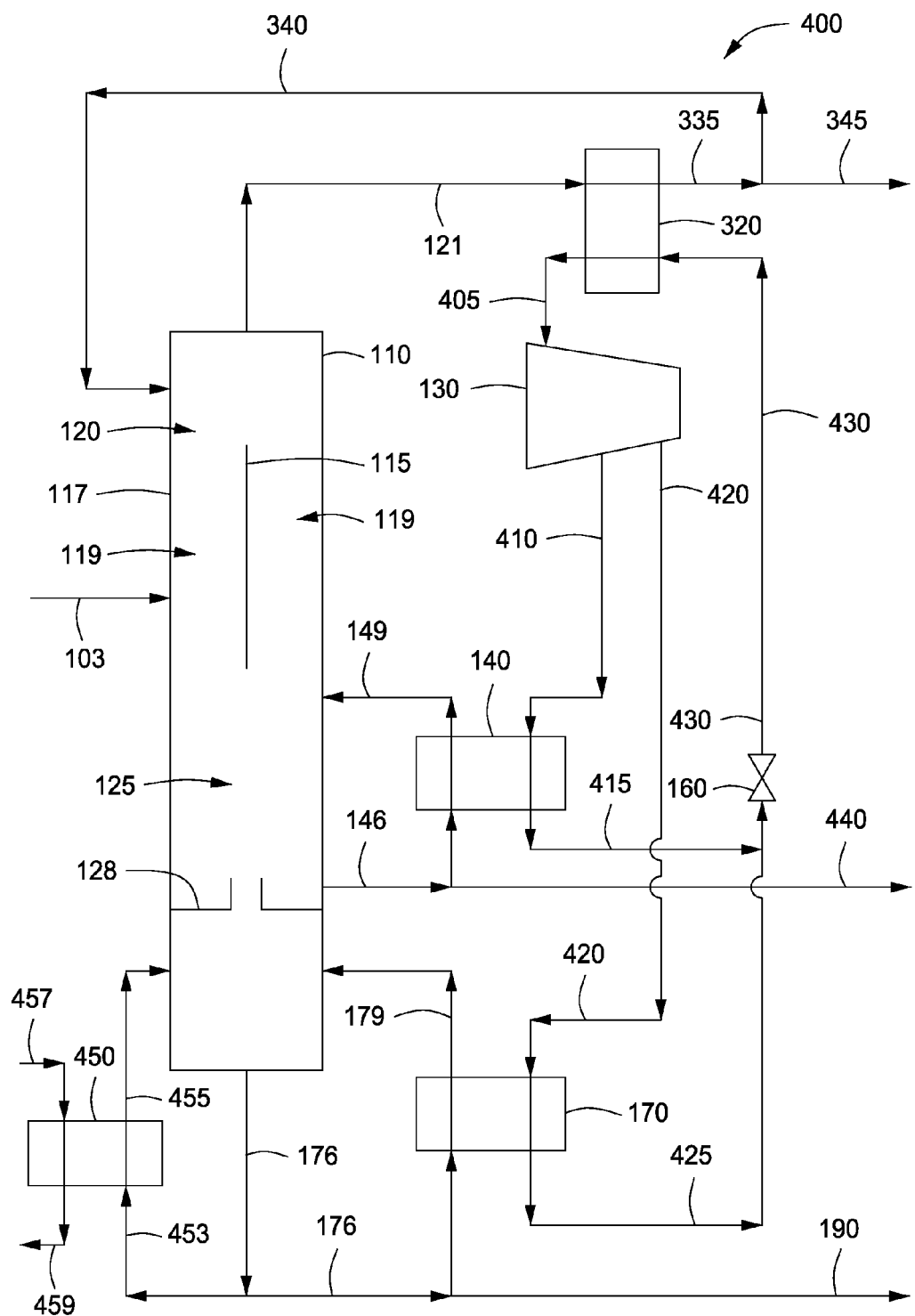
FIG. 4 depicts another illustrative system for fractionating a multi-component fluid using a fractionation column and a closed-loop heat pump system, according to one or more embodiments described.

FIG. 4 depicts another illustrative system 400 for fractionating a multi-component fluid using a dividing wall column and a closed-loop heat pump system, according to one or more embodiments. The system 400 can include, but is not limited to, one or more fractionation columns 110, one or more compressors 130, one or more heat exchange zones (four are shown 140, 170, 320), and one or more expansion valves 160, which can be similar to those discussed and described above with reference to FIGS. 1-3. In one or more embodiments, the system 400 can include a recirculated, "closed-loop," heat transfer medium which can meet the heating and cooling needs of all or a portion of the fractionation column 110. As such, the system 300 can include one or more heat exchange zones 320, which can transfer heat to the recirculated heat transfer medium. A multi-component fluid via line 103 can be introduced to the fractionation column 110. The fractionation column 110 can separate the multi-component fluid to provide a first product via line 121, an intermediate distillate via line 146, and a process fluid via line 176.

The heat transfer medium can be introduced via line 405 to the compressor 130 to provide a first compressed heat transfer medium via line 410 at a first temperature and first pressure and a second compressed heat transfer medium via line 420 at a second temperature and second pressure. The heat transfer medium in line 405 can be similar to the heat transfer medium discussed and described above with reference to FIG. 3. Although not shown, in one or more embodiments, the heat transfer medium in line 405 can be introduced to a separator prior to introduction to the one or more compressors 130 to remove at least a portion of any liquid to provide a gaseous heat transfer medium via line 405. Although not shown, in one or more embodiments, the compressed heat transfer medium in line 410 and/or line 420 can be introduced to one or more heat exchangers to provide a compressed heat transfer medium in line 410 and/or 420 having a higher temperature and/or pressure than provided by the one or more compressors 130.

The temperature of the first compressed heat transfer medium in line 410 can be greater than the boiling point of the intermediate distillate recovered via line 146 from the fractionation column 110. The temperature of the second compressed heat transfer medium in line 420 can be greater than the boiling point of the process fluid recovered via line 176 from the stripping section 125. The first temperature in line 410 can be less than or equal to the second temperature in line 420. The first pressure in line 410 can be less than or equal to the second pressure in line 420.

The compressed heat transfer medium recovered via line 410 from the compressor 130 can be introduced to the heat exchange zone 140, where heat can be indirectly transferred from the compressed heat transfer medium introduced via line 410 to the intermediate distillate introduced via line 146. A heated distillate via line 149 can be recovered from the heat exchange zone 140 and recycled to the fractionation column 110 and a cooled heat transfer medium via line 415 can be recovered from the heat exchange zone 140. In one or more embodiments, at least a portion of the intermediate distillate in line 146 can be partially or completely vaporized within the heat exchange zone 140. For example, about 5% wt, about 10% wt, about 25% wt, about 50% wt, about 75% wt, about 90% wt, about 95% wt, about 99% wt, or more of the intermediate distillate in line 146 can be vaporized in the heat exchange zone 140. The partially or completely vaporized intermediate distillate can be recycled via line 149 to the stripping section 125.

At least a portion of the intermediate distillate in line 146 can be recovered as a second product via line 440. For example, about 5% wt, about 10% wt, about 25% wt, about 50% wt, about 75% wt, about 90% wt, about 95% wt, about 99% wt, or more of the intermediate distillate in line 146 can be recovered as the second product via line 440.

The compressed heat transfer medium in line 420 can be introduced to the heat exchange zone 170, where heat can be indirectly transferred from the heat transfer medium to the process fluid introduced via line 176 to provide a heated process fluid via line 179 and a cooled heat transfer medium via line 425. In one or more embodiments, all or a portion of the process fluid via line 176 can be introduced to the heat exchange zone 170 with the balance recovered via line 190 as the third product. The cooled heat transfer medium via line 425 and can be expanded by flowing through one or more expansion valves 160. The expansion of the heat transfer medium through the one or more expansion valves 160 can reduce the pressure, thereby partially or completely vaporizing the heat transfer medium. In one or more embodiments, about 5% wt, about 10% wt, about 25% wt, about 50% wt, about 75% wt, about 90% wt, about 95% wt, about 99% wt, or more of the heat transfer medium in line 425 can be vaporized by flowing through the one or more expansion valves 160.

The cooled heat transfer medium in line 415 can be mixed or otherwise combined with the cooled heat transfer medium in line 425. The combined heat transfer mediums can be introduced to the expansion valve 160. Although not shown, in one or more embodiments, the one or more expansion valves 160 can be replaced by one or more expanders having a work output. For example, the one or more expansion valves 160 can be replaced by one or more fluid expanders having a work output. The work output provided by the one or more fluid expanders can be used to generate electricity via one or more generators (not shown). In another example the work output provided by the one or more fluid expanders can be used to help drive the compressor 130 by direct mechanical connection (not shown).

At least a portion of the heat transfer medium recovered via line 430 from the one or more expansion valves 160 can be introduced to the one or more third heat exchange zones 320. Within the one or more third heat exchange zones 320, the temperature of the first product introduced via line 121 can be reduced using all or a portion of the heat transfer medium in line 430. The heat transfer medium recovered via line 405 from the heat exchange zone 320 can be recycled to the compressor 130.

At least a portion of the first product in line 121 can be condensed within the heat exchange zone 320. For example, about 5% wt, about 10% wt, about 25% wt, about 50% wt, about 75% wt, about 90% wt, about 95% wt, about 99% wt, or more of the first product in line 121 can be condensed within the heat exchange zone 320. The first product can be recovered via line 335 from the heat exchange zone 320. At least a portion of the first product in line 335 can be recycled via line 340 to the rectification section 120. About 5% wt, about 10% wt, about 25% wt, about 50% wt, about 75% wt, about 95% wt, about 99% wt, or more of the first product in line 335 can be recovered via line 345 as a final product.

Although not shown, in one or more embodiments, the expanded heat transfer medium via line 430 can be introduced to an accumulator or separator to separate gaseous phase heat transfer medium from liquid phase heat transfer medium. The gaseous phase heat transfer medium from the separator can be introduced to the compressor 130 and the liquid phase heat transfer medium can be introduced to the heat exchange zone 320.

Depending on the process conditions and system requirements, an optional supplemental heat exchange zone 450 can be use to provide heat to at least a portion of the process fluid recovered via line 176. A heat transfer medium via line 457 can be introduced to the heat exchange zone 450, where heat can be indirectly transferred from the heat transfer medium to the process fluid introduced via line 453 to provide a heated process fluid via line 455 and a cooled heat transfer medium via line 459. The heated process fluid can be recycled via line 455 to the stripping section 125. At least a portion of the process fluid introduced via line 453 to the supplemental heat exchange zone 450 can be vaporized within the supplemental heat exchange zone 450. About 5% wt, about 10% wt, about 25% wt, about 50% wt, about 75% wt, about 90% wt, about 95% wt, about 99% wt, or more of the fluid in line 453 can be vaporized within the supplemental heat exchange zone 450 and recycled via line 455 to the stripping section 125.

The heat transfer medium in line 457 can include, but is not limited to, water, steam, process fluids, exhaust gases, heat transfer oils or hydrocarbons, or any combination thereof. The heat transfer medium in line 457 can be at any suitable pressure and temperature which can depend upon the operating requirements of the system 200.

The heat exchange zone 450 can include any system, device, or combination of systems and/or devices for increasing the temperature of the fluid introduced via line 453. In one or more embodiments, the supplemental heat exchange zone 450 can include one or more shell-and-tube exchangers, plate-and-frame exchangers, U-tube exchangers, bent-tube exchangers, bayonet-tube exchangers, spiral wound exchangers, falling-film exchangers or any combination thereof. In one or more embodiments, the supplemental heat exchange zone 450 can be a direct fired heater.

The supplemental heat exchange zone 450 can be operated at a temperature ranging from a low of about −200° C., about −100° C., about −50° C., about 0° C., or about 50° C. to a high of about 100° C., about 300° C., about 500° C., about 700° C., or about 1,000° C. The supplemental heat exchange zone 450 can be operated at a pressure ranging from a low of about 50 kPa, about 75 kPa, about 100 kPa, about 200 kPa, or about 300 kPa to a high of about 400 kPa, about 600 kPa, about 900 kPa, about 1,200 kPa, about 1,500 kPa, about 2,000 kPa, or about 3,000 kPa.

Figure 5:
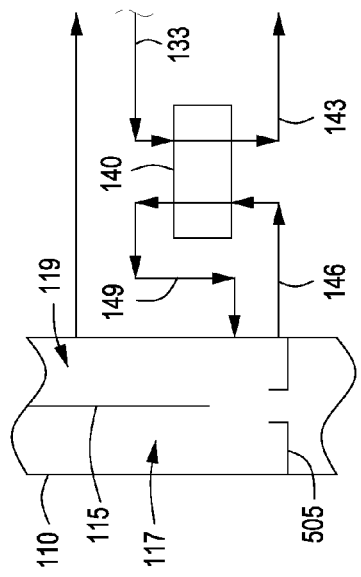
FIG. 5 depicts a partial schematic of an illustrative intermediate fluid recovery arrangement from a fractionation column, according to one or more embodiments described.

FIG. 5 depicts a partial schematic of an illustrative intermediate fluid recovery arrangement from a fractionation column, according to one or more embodiments. In one or more embodiments, a chimney tray 505 or other appropriate liquid trap-out device, for example, can be disposed within the stripping section 125. The chimney tray can provide a liquid via line 146, which can be introduced to the heat exchange zone 140 as discussed and described above with reference to FIGS. 1-4. The particular position or location of the chimney tray 505 within the stripping section 125 can affect the amount or magnitude of energy savings provided by the systems 100, 200, 300, and 400 discussed and described above with reference to FIGS. 1-4. The position or location of the chimney tray 505 can also affect the particular amount or concentration of the one or more components in the fluid recovered via line 146, which can also depend upon the composition of the multi-component fluid introduced via line 103.

Figure 6:
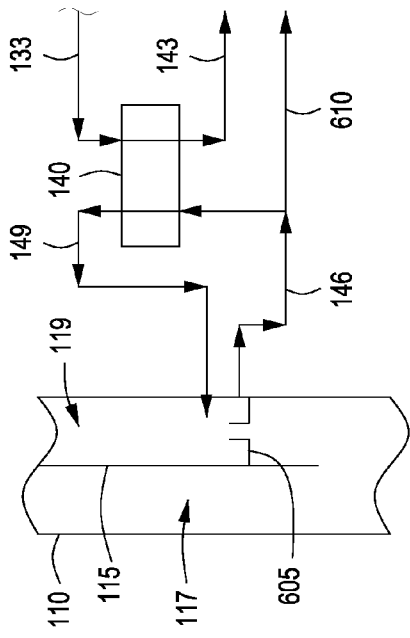
FIG. 6 depicts another partial schematic of an illustrative intermediate fluid recovery arrangement from a fractionation column, according to one or more embodiments described.

FIG. 6 depicts another partial schematic of an illustrative intermediate fluid recovery arrangement from a fractionation column, according to one or more embodiments. In one or more embodiments, a chimney tray 605 or other appropriate liquid trap-out device, for example, can be disposed within the second fractionation zone 119. As shown, the chimney tray 605 is disposed above the lower end of the dividing wall 115. The particular position or location of the chimney tray 605 within the second fractionation zone 119 can affect the amount or magnitude of energy savings provided by the systems 100, 200, 300, and 400 discussed and described above with reference to FIGS. 1-4. The position or location of the chimney tray 605 can also affect the particular amount or concentration of the one or more components in the fluid recovered via line 146, which can also depend upon the composition of the multi-component fluid introduced via line 103.

Figure 7:
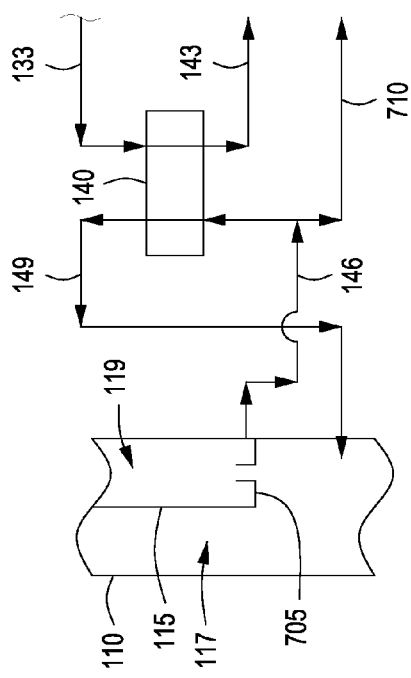
FIG. 7 depicts yet another partial schematic of an illustrative intermediate fluid recovery arrangement from a fractionation column, according to one or more embodiments described.

FIG. 7 depicts yet another partial schematic of an illustrative intermediate fluid recovery arrangement from a fractionation column, according to one or more embodiments. In one or more embodiments, a chimney tray 705 or other appropriate liquid trap-out device, for example, can be disposed at one end of the dividing wall 115, toward the stripping section 125. Positioning the chimney tray at the end of the dividing wall 115 can provide a different amount of energy savings provided by placing the chimney tray 705 within the second fractionation section 119 or within the stripping section 125 as shown in FIGS. 5 and 6, respectively.

Embodiments of the present invention can be further described with the following prophetic examples. Six simulated examples are provided. Four examples (Examples 1-4) are directed to separating a multi-component fluid using the high and low pressure heat pumps (i.e. heat exchangers 140, 170), according to one or more embodiments described above with regard to FIGS. 1 and 2, and two comparative examples (Examples C1 and C2) are directed to separating the same multi-component fluid using only a dividing wall column without a heat pump (i.e. heat exchangers 140, 170).

More particularly, Example 1 uses a low pressure heat pump 140 in combination with the dividing wall column 110 using a fired heater for imported heat; Example 2 uses both a low pressure heat pump 140 and a high pressure heat pump 170 in combination with the dividing wall column 110 using a fired heater for imported heat; Example 3 uses a low pressure heat pump 140 in combination with the dividing wall column 110 using steam for imported heat; and Example 4 uses both a low pressure heat pump 140 and a high pressure heat pump 170 in combination with the dividing wall column 110 using steam for imported heat.

All heat introduced to the separation system of comparative examples C1 and C2 is provided from an external source, i.e. no heat pumps 140, 170 are used. In comparative example C1, a fired heater is used and in example C2, steam is used.

For all examples, the feed is a multi-component hydrocarbon comprising 0.25 mol % $C_3$'s; 19.4 mol % i-butane; 48.2 mol % n-butane; and mixed $C_5$'s and heavier hydrocarbons. For all examples, the multi-component feed is separated within the dividing wall column 110 to provide a first product via line 121 comprising 98 mol % or greater i-butane; a second via line 180 comprising 98 mol % or greater n-butane, and a third product or process fluid via line 176 comprising $C_5$'s and heavier components. The flow rate of the feed via line 103 to the dividing wall column 110 is 600 kmol/hr. The average molecular weight of the feed via line 103 is 64.5. Table 1 summarizes the simulated results.

wall column 110 alone, but not as significantly as the dividing wall column 110 with the low pressure heat pump 140 alone, which is about 10% less or $1,370,000.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

TABLE 1

Summary of heat requirements and annual heating costs.

| | Comp. Ex 1 | | Ex 1 | | Ex 2 | | Comp. Ex 2 | | Ex. 3 | | Ex. 4 | |
|---|---|---|---|---|---|---|---|---|---|---|---|---|
| Components | Energy Required (MJ/sec) | Annual Cost[1] ($1,000 US) | Energy Required (MJ/sec) | Annual Cost[1] ($1,000 US) | Energy Required (MJ/sec) | Annual Cost[1] ($1,000 US) | Energy Required (MJ/sec) | Annual Cost[1] ($1,000 US) | Energy Required (MJ/sec) | Annual Cost[1] ($1,000 US) | Energy Requirec (MJ/sec) | Annual Cost[1] ($1,000 US) |
| Heat Exchanger 140 | 8.83 | $2034.3 | 3.95 | $ 909.4 | 0.27 | $ 62.8 | 8.83 | $1332.8 | 3.95 | $ 595.8 | 0.27 | $ 41.1 |
| Condenser/Sub-cooler 126 | 9.73 | $ 185.6 | 3.93 | $ 75.0 | 1.56 | $ 29.7 | 9.73 | $ 185.6 | 3.93 | $ 75 | 1.56 | $ 29.7 |
| Condenser/Sub-cooler 145 | — | — | 2.22 | $ 42.3 | 2.22 | $ 42.2 | — | — | — | — | — | — |
| Power to Compressor | — | — | 0.96 | $ 534.3 | 2.27 | $1256.7 | — | — | 2.22 | $ 42.3 | 2.22 | $ 42.2 |
| Heat Exchanger 170 | — | — | — | — | — | — | — | — | 0.96 | $ 534.3 | 2.27 | $1256.7 |
| Totals | 18.56 | $2219.9 | 11.06 | $1561 | 6.32 | $1391.4 | 18.56 | $1518.3 | 11.06 | $1247.4 | 6.32 | $1369.8 |

[1]Annual cost represents the combined annual total cost in thousands of U.S. dollars. The oil prices used for these simulated processes are $45.00 per bbl, $6.50 per MMBtU, and $66.00 per MWhr.

As shown in Table 1, the annual cost of operating a dividing wall column 110 without a low pressure heat pump and without a high pressure heat pump is about $2,200,000. Surprisingly, the addition of the low pressure heat pump 140 provides a significant reduction in operating cost, which is about 30% less or $1,561,000. More surprisingly, the addition of both the low pressure heat pump 140 and the high pressure heat pump 170 reduces the operating cost by about 37% less or $1,391,000.

Additionally, the annual cost of operating a dividing wall column 110 without a low pressure heat pump 140 and without a high pressure heat pump 170 is about $1,518,000. Surprisingly, the addition of the low pressure heat pump 140 provides a significant reduction in operating cost, i.e. about 18% less or $1,247,000. Also surprisingly, the addition of both the low pressure heat pump 140 and the high pressure heat pump 170 reduces the operating cost over the dividing

What is claimed is:

1. A method for separating a multi-component fluid, comprising:
   introducing a multi-component fluid to a dividing wall column comprising:
      a fractionating section comprising a first fractionation zone and a second fractionation zone separated by a dividing wall; and
      a stripping section disposed below the fractionating section, wherein the multi-component fluid is introduced to the first fractionation zone;
   heating the multi-component fluid within the dividing wall column to provide a first product, a second product, an intermediate distillate, and a process fluid;
   compressing at least a portion of the first product to provide a compressed first product;
   indirectly transferring heat from the compressed first product to at least a portion of the intermediate distillate to provide a heated intermediate distillate;

recycling the heated intermediate distillate to the dividing wall column; and expanding the compressed first product to provide an expanded first product.

2. The method of claim 1, further comprising condensing another portion of the first product and recovering at least a portion of the condensed first product as a final first product.

3. The method of claim 1, further comprising indirectly transferring heat from a heat transfer medium to a first portion of the process fluid to provide a heated process fluid, recycling the heated process fluid to the dividing wall column, and recovering a second portion of the process fluid as a third product.

4. The method of claim 1, further comprising recycling at least a portion of the expanded first product to the dividing wall column.

5. The method of claim 1, further comprising cooling the compressed first product prior to expanding the compressed first product.

6. The method of claim 1, wherein the first product is withdrawn from the top of the dividing wall column as an overhead.

7. The method of claim 1, wherein the intermediate distillate is withdrawn from the stripping section.

8. A method for separating a multi-component fluid, comprising:
   introducing a multi-component fluid to a dividing wall column comprising:
      a fractionating section comprising a first fractionation zone and a second fractionation zone separated by a dividing wall; and
      a stripping section disposed below the fractionating section, wherein the multi-component fluid is introduced to the first fractionation zone;
   heating the multi-component fluid within the dividing wall column to provide a first product, a second product, an intermediate distillate, and a process fluid;
   compressing a first portion of the first product to a first pressure;
   compressing a second portion of the first product to a second pressure;
   indirectly transferring heat from the first product at the first pressure to at least a portion of the intermediate distillate to provide a heated intermediate distillate and a first cooled first product;
   indirectly transferring heat from the first product at the second pressure to a first portion of the process fluid to provide a first heated process fluid and a second cooled first product;
   recycling the heated intermediate distillate to the dividing wall column; and
   recycling the heated process fluid to the dividing wall column.

9. The method of claim 8, further comprising expanding the second cooled first product to provide a gaseous phase first product and a liquid phase first product; and combining the gaseous phase first product with the first product at the first pressure.

10. The method of claim 9, further comprising expanding the liquid phase first product; expanding the first cooled first product; and combining the expanded liquid phase first product and the expanded first cooled first product to provide a mixed first product.

11. The method of claim 8, further comprising indirectly transferring heat from a heat transfer medium to a second portion of the process fluid to provide a second heated process fluid; and recycling the second heated process fluid to the dividing wall column.

12. A method for separating a multi-component fluid, comprising: introducing a multi-component fluid to a dividing wall column comprising:
   a fractionating section comprising a first fractionation zone and a second fractionation zone separated by a dividing wall; and
   a stripping section disposed below the fractionating section, wherein the multi-component fluid is introduced to the first fractionation zone;
   heating the multi-component fluid within the dividing wall column to provide a first product, a second product, an intermediate distillate, and a process fluid;
   compressing a first portion of the first product to a first pressure;
   compressing a second portion of the first product to a second pressure;
   indirectly transferring heat from the first product at the first pressure to at least a portion of the intermediate distillate to provide a heated intermediate distillate and a first cooled first product;
   indirectly transferring heat from the first product at the second pressure to a first portion of the process fluid to provide a first heated process fluid and a second cooled first product;
   recycling the heated intermediate distillate to the dividing wall column; and
   recycling the heated process fluid to the dividing wall column,
   expanding the second cooled first product to provide a gaseous phase first product and a liquid phase first product;
   combining the gaseous phase first product with the first product at the first pressure;
   expanding the liquid phase first product; expanding the first cooled first product;
   combining the expanded liquid phase first product and the expanded first cooled first product to provide a mixed first product; and
   recycling a first portion of the mixed first product to the dividing wall column and recovering a second portion of the mixed first product as a final first product.

13. A method for separating a multi-component fluid, comprising: introducing a multi-component fluid to a dividing wall column comprising:
   a fractionating section comprising a first fractionation zone and a second fractionation zone separated by a dividing wall; and
   a stripping section disposed below the fractionating section, wherein the multi-component fluid is introduced to the first fractionation zone;
   heating the multi-component fluid within the dividing wall column to provide a first product, a second product, an intermediate distillate, and a process fluid;
   compressing a first portion of the first product to a first pressure;
   compressing a second portion of the first product to a second pressure;
   indirectly transferring heat from the first product at the first pressure to at least a portion of the intermediate distillate to provide a heated intermediate distillate and a first cooled first product;

indirectly transferring heat from the first product at the second pressure to a first portion of the process fluid to provide a first heated process fluid and a second cooled first product;

recycling the heated intermediate distillate to the dividing wall column; and recycling the heated process fluid to the dividing wall column, expanding the second cooled first product to provide a gaseous phase first product and a liquid phase first product;

combining the gaseous phase first product with the first product at the first pressure;

expanding the liquid phase first product; expanding the first cooled first product; combining the expanded liquid phase first product and the expanded first cooled first product to provide a mixed first product; and cooling the mixed first product by indirectly transferring heat from the mixed first product to a heat transfer medium.

14. A method for separating a multi-component fluid, comprising:

introducing a multi-component fluid to a dividing wall column comprising:
  a fractionating section comprising a first fractionation zone and a second fractionation zone separated by a dividing wall; and
  a stripping section disposed below the fractionating section, wherein the multi-component fluid is introduced to the first fractionation zone;

heating the multi-component fluid within the dividing wall column to provide a first product, an intermediate distillate, and a process fluid;

indirectly transferring heat from the first product to a heat transfer medium to provide a cooled first product;

compressing the heat transfer medium to provide a compressed heat transfer medium;

indirectly transferring heat from the compressed heat transfer medium to a portion of the intermediate distillate to provide a heated intermediate distillate;

recovering a portion of the intermediate distillate as a second product;

recycling the heated intermediate distillate to the dividing wall column;

expanding the compressed heat transfer medium to provide the heat transfer medium; and recovering at least a portion of the process fluid as a third product.

15. The method of claim 14, further comprising indirectly transferring heat from a second heat transfer medium to a portion of the process fluid to provide a heated process fluid; and recycling the heated process fluid to the dividing wall column.

16. The method of claim 14, further comprising recycling at least a portion of the cooled first product to the dividing wall column.

17. The method of claim 14, wherein the heat transfer medium is a two phase liquid and gas mixture.

18. A method for separating a multi-component fluid, comprising:

introducing a multi-component fluid to a dividing wall column comprising:
  a fractionating section comprising a first fractionation zone and a second fractionation zone separated by a dividing wall; and
  a stripping section disposed below the fractionating section, wherein the multi-component fluid is introduced to the first fractionation zone;

heating the multi-component fluid within the dividing wall column to provide a first product, an intermediate distillate, and a process fluid;

indirectly transferring heat from the first product to a heat transfer medium to provide a cooled first product;

compressing a portion of the heat transfer medium to a first pressure;

compressing a portion of the heat transfer medium to a second pressure;

indirectly exchanging heat from the heat transfer medium at the first pressure to at least a portion of the intermediate distillate to provide a heated intermediate distillate;

recycling the heated intermediate distillate to the dividing wall column;

indirectly exchanging heat from the heat transfer medium at the second pressure to a first portion of the process fluid to provide a first heated process fluid;

recycling the heated process fluid to the dividing wall column; and recovering a second portion of the process fluid as a third product.

19. The method of claim 18, further comprising recycling a portion of the cooled first product to the dividing wall column.

20. The method of claim 18, further comprising combining the heat transfer medium at the first pressure and the heat transfer medium at the second pressure after indirectly transferring heat to provide a mixed heat transfer medium, and expanding the mixed heat transfer medium to provide the heat transfer medium.

21. The method of claim 18, further comprising indirectly transferring heat from a second heat transfer medium to a third portion of the process fluid to provide a second heated process fluid, and recycling the second heated process fluid to the dividing wall column.

22. The method of claim 18, further comprising recycling at least a portion of the cooled first product to the dividing wall column.

* * * * *